United States Patent [19]
Briar et al.

[11] 3,831,723
[45] Aug. 27, 1974

[54] ELECTROMAGNETIC SPRING-WOUND CLUTCH

[75] Inventors: John R. Briar, Dayton; Frederick M. Grabek, Kettering, both of Ohio

[73] Assignee: General Motors Corporation, Detroit, Mich.

[22] Filed: Apr. 18, 1973

[21] Appl. No.: 352,089

[52] U.S. Cl. .............................. 192/35, 192/84 T
[51] Int. Cl. ............................................ F16d 27/10
[58] Field of Search ........................... 192/35, 84 T

[56] References Cited
UNITED STATES PATENTS
3,685,622  8/1972  Baer et al. ...................... 192/84 T
3,735,847  5/1973  Brucken ......................... 192/84 T Primary Examiner—Allan D. Herrmann
Attorney, Agent, or Firm—John P. Moran

[57] ABSTRACT

An improved electromagnetic spring-wound clutch wherein a pair of cooperating clutch armature discs are drawn into contact with a rotating input pole member to cause a pair of interthreaded coil springs to grippingly engage axially aligned driving and driven members in a balanced manner at oppositely disposed sides thereof.

7 Claims, 13 Drawing Figures

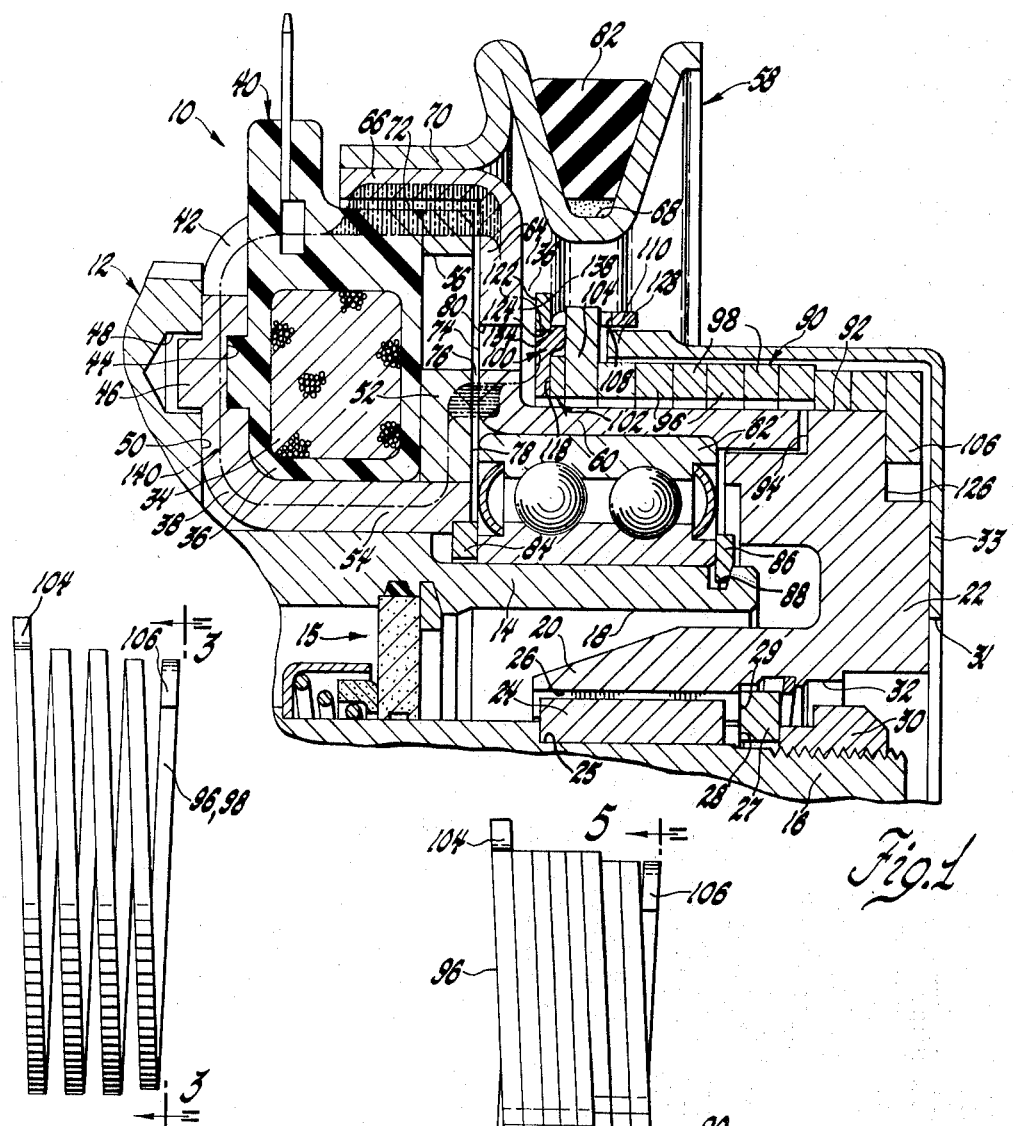
Fig.1
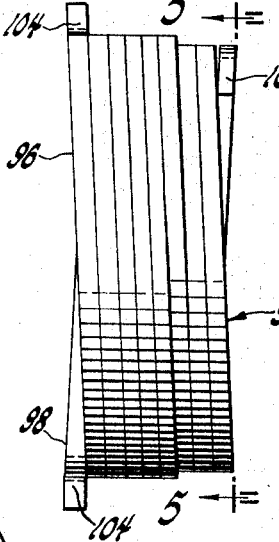
Fig.2
Fig.4
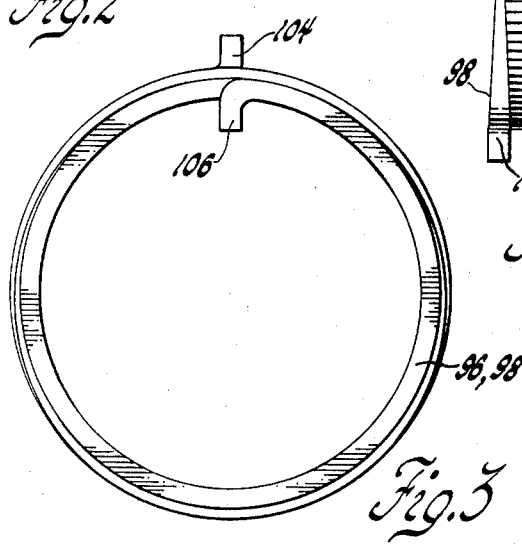
Fig.3
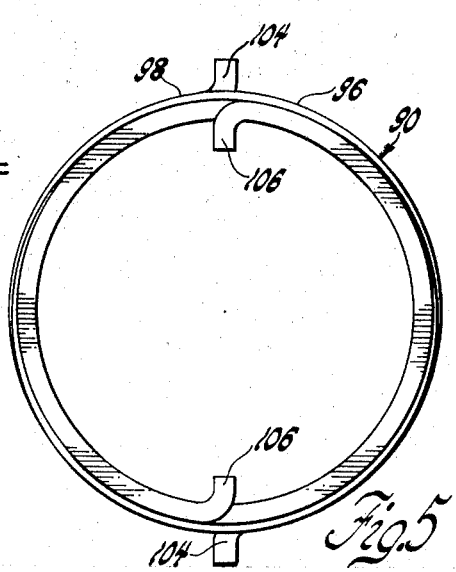
Fig.5

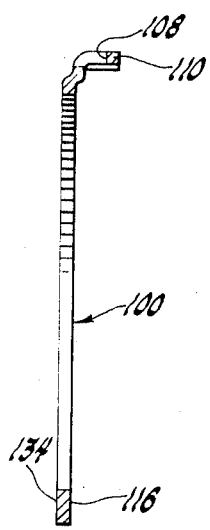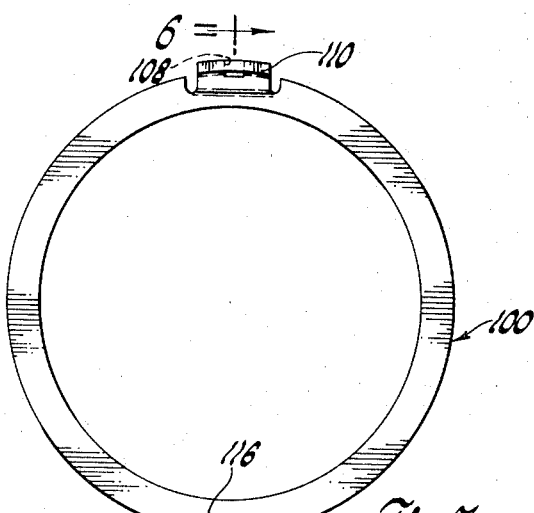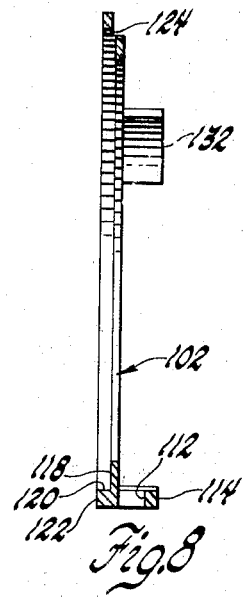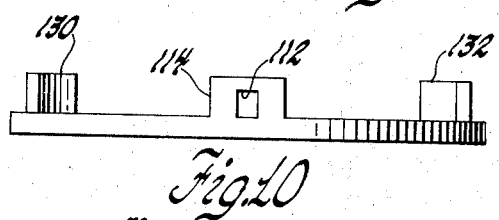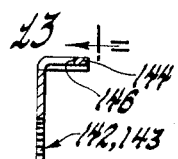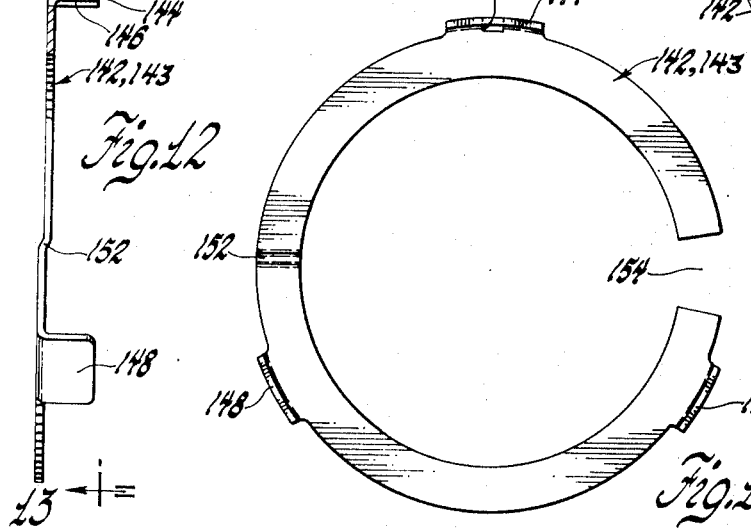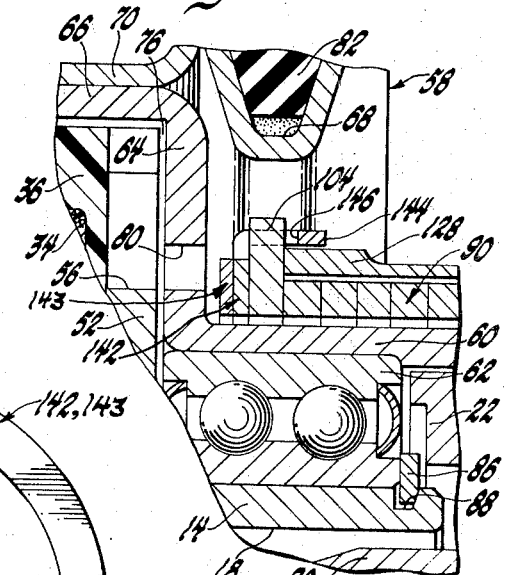

ELECTROMAGNETIC SPRING-WOUND CLUTCH

This invention relates generally to clutches and, more particularly, to electromagnetic spring-wound clutches.

A general object of the invention is to provide an improved electromagnetic spring-wound clutch.

Another object of the invention is to provide an improved electromagnetic spring-wound clutch including means for actuating the engagement thereof in a balanced manner at oppositely disposed sides of axially aligned driving and driven members.

A further object of the invention is to provide an electromagnetic spring-wound clutch wherein a radial wall member of an input pulley assembly serves as a magnetic pole member for cooperation with a coil and a pair of clutch armature discs which operate as a unit and are slidably, yet drivably associated with a pair of interwoven coil springs, the two armature discs serving to engage the respective two springs at oppositely disposed sides thereof to cause the springs to simultaneously grippingly engage driving and driven members in an efficient, balanced manner.

These and other objects and advantages of the invention will be apparent when reference is made to the following description and accompanying drawings, wherein:

FIG. 1 is a fragmentary cross-sectional view of an electromagnetic spring-wound clutch embodying the invention;

FIG. 2 is a side elevational view of a component of the FIG. 1 structure;

FIG. 3 is an end view taken along the plane of line 3—3 of FIG. 2, and looking in the direction of the arrows;

FIG. 4 is a side elevational view of a subassembly of the FIG. 1 structure;

FIG. 5 is an end view taken along the plane of line 5—5 of FIG. 4, and looking in the direction of the arrows;

FIGS. 7 and 9 are end views of important components of the FIG. 1 structure;

FIG. 6 is a cross-sectional view taken along the plane of line 6—6 of FIG. 7, and looking in the direction of the arrows;

FIG. 8 is a cross-sectional view taken along the plane of line 8—8 of FIG. 9, and looking in the direction of the arrows;

FIG. 10 is an end view taken along the plane of line 10—10 of FIG. 9, and looking in the direction of the arrows;

FIG. 11 is a fragmentary cross-sectional view of an electromagnetic spring-wound clutch illustrating an alternate embodiment of the invention;

FIG. 12 is a fragmentary cross-sectional view of an important component of the FIG. 11 structure; and FIG. 13 is an end view taken along the plane of line 13—13 of FIG. 12, and looking in the direction of the arrows.

Referring now to the drawings in greater detail, FIG. 1 illustrates an electromagnetic spring-wound clutch 10 suitable for driving an air-conditioning compressor, represented generally at 12, on the forward end of which is formed a tubular extension 14. An output shaft 16 for driving the compressor 12 is rotatably mounted at the center of the clutch 10 and extends concentrically through the tubular extension 14. A suitable shaft seal arrangement, represented generally at 15, is mounted around an intermediate portion of the output shaft 16, within the extension 14, in the usual manner, such as illustrated and described in pending U.S. Pat. No. 3,735,847 issued May 29, 1973 in the name of Byron L. Brucken.

The enlarged inner bore 18 of the tubular extension 14 provides space for the accommodation of the greater portion of a hub 20 of a driven member 22, the hub 20 being keyed for rotation with the output shaft 16 by a suitable key 24 mounted in slots 25 and 26 formed in the shaft 16 and hub 20, respectively. The hub 20 is retained axially with respect to the shaft 16 by a spacer ring 27 maintained in contact with shaft and hub shoulders 28 and 29, respectively, by a nut 30 threadedly mounted on the end portion of the shaft 16 through central openings 31 and 32 formed in a retaining cap or end cover 33 and in the hub 20, respectively. The retaining cap 33 is secured in any suitable manner to the outer face of the driven member 22.

An annular electromagnetic coil 34, consisting of a predetermined number of turns, is mounted around the tubular extension 14. The coil 34 is embedded within a suitable resin 36, such as epoxy or nylon or polyester resin, the coil-resin assembly 34/36 being mounted in an annular coil housing 38. A terminal assembly 40 is formed on the coil-resin assembly 34/36 and extends outwardly through an open portion 42 of the housing 38 as a means for energizing the coil 34.

The coil housing 38 is formed of a paramagnetic material, such as steel or malleable iron, and is provided with a plurality of locking recesses 44 into which the resin 36 is cast. In addition, the coil housing 38 is provided with a plurality of integral projections 46 which extend within respective recesses 48 formed in the adjacent forward wall 50 of the compressor 12. A wall member 52 is secured to the inner cylindrical wall 54 of the coil housing 38 in any suitable manner, such as by being press-fitted thereon to form a fourth wall around the coil 34. A plurality of circumferentially aligned arcuate slots 56 are formed through the wall member 52 at a predetermined location thereon.

A pulley assembly 58 includes a hub member 60 mounted on bearings 62 around the tubular extension 14, a radially extending wall 64 formed on the hub member 60 and having a first cylindrical flange 66 formed thereon, and a pulley groove portion 68 formed on a second cylindrical flange 70, the latter being secured to the first cylindrical flange 66 in any suitable manner. The pulley groove portion 68 is formed so as to be radially aligned with the hub member 60. The cylindrical flange 66 extends past a portion of the coil housing 38, spaced a predetermined air gap or space 72 apart therefrom. The location of the outer surface 74 of the radial wall 64 is such that a radial air gap or space 76 of a predetermined width exists between the outer surface 74 and the adjacent surface 78 of the coil housing wall member 52. A plurality of circumferentially aligned arcuate slots 80 are formed through the radial wall 64 at an intermediate location thereon. An engine-driven belt 82 is mounted in the pulley groove portion 68. The bearings 62 are axially confined between a washer-like bearing spacer 84 and a retainer ring 86 mounted in a groove 88 formed adjacent the end of the tubular extension 14.

A coil-wound spring assembly 90 is mounted around the pulley hub member 60 and the radial outer surface 92 of the driven member 22, the end of the pulley hub member 60 extending into an annular recess 94 formed in the driven member 22. The spring assembly 90 includes a pair of identical coil springs 96 and 98 (FIG. 2), threaded together as better illustrated in FIG. 4, to serve as a resilient unit for cooperation with a pair of clutch armature discs 100 and 102 (FIGS. 6–10), operatively interconnected and abutted against one another as shown fragmentarily in FIG. 1.

An outwardly extending bent-end tab 104 is formed on one end loop of each spring 96 and 98, while an inwardly extending bent-end tab 106 is formed on the other end loop of each spring. One end-tab 104 extends through an opening 108 formed in a lip or tab 110 extending transversely from the outer peripheral edge of the armature disc 100, while the other end-tab 106 extends through an opening 112 formed in a lip or tab 114 extending transversely from the outer peripheral edge of the armature disc 102. At assembly, a face 116 (FIG. 6) of the disc 100 abuts against a surface 118 of the disc 102 resulting from the formation of a recess 120 in a face 122 of the disc 102. The lip 110 extends through an arcuate opening 124 (FIG. 8) formed in the disc 102 at the radial outer portion of the recess 120, as shown in FIG. 1, resulting in the lips 110 and 114 being oppositely disposed to accommodate the dual spring arrangment of FIG. 5. The end-tabs 106 extend into oppositely disposed radial slots 126 (FIG. 1) formed adjacent the end face of the driven member 22.

As may be noted in FIG. 1, the spring assembly 90 is confined within a cylindrical wall 128 of the retaining cap 33 and, in its free state, the left portion of the spring assembly 90 is spaced apart radially from the pulley hub member 60. The right portion of the spring assembly 90, being smaller in diameter than the left portion, is spaced radially apart from the cylindrical wall 128, and is secured to the driven member 22 by virtue of the tabs 106 being mounted in the radial slots 126 of the driven member 22, as indicated above. Lips 110 and 114 of the armature discs 100 and 102, respectively, are slidably mounted around the cylindrical wall 128 of the retaining cap 33. Two additional tabs or lips 130 and 132 are formed on the disc 102, equally spaced with respect to the tab 114, to serve as guides for the disc 100/102 assembly around the retaining cap 33. As may be noted in FIG. 1, the face 134 of the armature disc 100 is positioned a predetermined air gap or space 136 width apart from the adjacent surface 138 of the radial pulley wall 64, while the coil 34 remains in the unenergized state.

OPERATION

In operation, the clutch 10 is engaged by the energization of the electromagnetic coil 34 via the terminal assembly 40 which causes the magnetic flux to traverse a path through the adjacent paramagnetic materials, the path being indicated by 140 in FIG. 1. More specifically, the path of the flux is primarily from the coil 34 to the surrounding walls of the coil housing 38, radially outwardly across the air gap 72, to the cylindrical flange 66 formed on the radial wall 64 of the pulley assembly 58, and thence to the radial wall 64 outward of the arcuate slots 80.

The flux next crosses the radial gap 136, outwardly of the arcuate slots 80, from the radial wall 64 to enter the armature discs 100 and 102, pulling them toward the wall 64 until the disc 100 abuts thereagainst. The flux then once again crosses the variable radially extending gap 136 to the radial pulley wall 64 of the pulley assembly 58, inwardly of the arcuate slots 80, after which the flux crosses the constant width gap 76 to the coil housing wall member 52 to complete the circuit to the inner cylindrical wall 54 of the coil housing 38.

This arrangement provides a strong, two-pole magnetic clutch field which attracts the armature disc 100/102 assembly, effecting the above-mentioned face-to-face engagement of the closer disc 100 with the radial wall 64 of the pulley assembly 58. Once this occurs, the left portion (FIG. 1) of the coil-wound spring assembly 90 is wound into gripping contact around the rotating hub member 60 of the pulley assembly 58. Since the right portion (FIG. 1) of the spring assembly 90 is secured to the driven member 22 by virtue of the end-tabs 106 being inserted in the slots 126 formed in the driven member 22, the member 22 will thus be caused to rotate, in turn, driving the hub 20, the output shaft 16, and the compressor 12. Inasmuch as the assembled pairs of end-tabs 104 and 106 are each substantially 180 degrees apart, the effect is a balanced engagement of the two springs 96 and 98 around the members 60 and 22 upon energization of the coil 34.

When the coil 34 is deenergized, nulling the magnetic attraction across the gaps 72, 76, and 136, the armature disc 100 will be released from the radial pulley wall 64, thereby releasing the bent end-tab 104 of each spring 96 and 98 of the spring assembly 90 and thus permitting the latter to unwind from the pulley hub member 60, breaking the driving connection between the input pulley assembly 58 and the output shaft 16.

Referring now to the alternate embodiment of FIGS. 11–13, those elements which are the same as their counterparts in the FIG. 1 structure bear the same reference numerals. In lieu of the pair of differently shaped clutch armature discs 100 and 102, two identical discs 142 and 143 are utilized in cooperation with the end-tabs 104 of springs 96 and 98 of the spring assembly 90.

As illustrated in FIGS. 12 and 13, each disc 142 and 143 includes a tab or lip 144 having an opening 146 formed therein to accommodate the extension therethrough of one of the spring 96/98 end-tabs 104. Two additional tabs or lips 148 and 150 are formed on each disc 142 and 143 to serve as guide elements around the cylindrical wall 128 of the retaining cap 33. Each disc 142 and 143 also includes a radial bend-portion 152 which serves to offset the upper and lower halves thereof an amount equal to the thickness of the disc 142 or 143.

By virtue of the cut-out or broken portion or space 154 directly oppositely disposed from the bend-portion 152, it may be realized that two discs 142 and 143 may, in effect, be threaded together so as to be assembled on one another such that respective lower and upper halves abut against one another, forming respective outer assembled coplanar surfaces which are two disc-142 or 143 thicknesses apart. Respective spring tab openings 146 are, of course, oppositely disposed from one another, as was the case with the openings 108 and 112 formed respectively in the tabs 110 and 114 of the respective armature discs 100 and 102.

As may be noted in FIG. 11, the cooperating assembly of identical discs 142 and 143 will be drawn toward the radial wall pole member 64, with the adjacent surface composed of half of each disc 142 abutting thereagainst, upon energization of the coil 34, in the manner discussed above.

It should be apparent that the invention provides an improved electromagnetic spring-wound clutch, resulting in an efficient actuation of a pair of clutch armature rings and a cooperating pair of interthreaded coil springs, such that balanced conditions prevail during the engagement and disengagement operations of the dual springs on the driving and driven members.

While but two embodiments of the invention have been shown and described, other modifications thereof are possible.

We claim:

1. An electromagnetic spring-wound clutch comprising driving and driven members axially aligned for relative rotation about a common axis, a stationary coil housing, an electromagnetic coil mounted in said coil housing, a coil-wound spring assembly including two coil springs threadedly interconnected and mounted as a unit around adjacent portions of said driving and driven members and each of said two coil springs having one end thereof drivingly connected to oppositely disposed portions of said driven member, a pair of abutting clutch armature discs respectively operatively connected to oppositely disposed portions of the other ends of said two coil springs so as to be rotatable therewith and axially movable as a unit relative thereto, and a radially extending pole member formed on said driving member intermediate said adjacent clutch armature disc and said coil housing, said coil when energized drawing said pair of abutting clutch armature discs axially into frictional contact with said pole member without axially moving said other end of said coil-wound spring assembly while circumferentially restraining said other end of said spring assembly and causing said spring assembly to grippingly engage said driving member to thereby drive said driven member.

2. An electromagnetic spring-wound clutch comprising driving and driven members axially aligned for relative rotation about a common axis, a stationary coil housing, an electromagnetic coil mounted in said coil housing, a coil-wound spring assembly including two coil springs threadedly interconnected and mounted around adjacent portions of said driving and driven members and having one end thereof drivingly connected to said driven member and oppositely disposed outwardly extending tabs formed on the respective other ends of said two coil springs, a pair of abutting clutch armature disc members each including an annular portion and an axially extending lip portion, an opening formed in each of said axially extending lip portions for the respective extension therethrough of said outwardly extending tabs, and a radially extending pole member formed on said driving member intermediate said annular portion of said adjacent clutch armature disc member and said coil housing respective predetermined air spaces apart therefrom, said coil when energized drawing said pair of clutch armature disc members axially through one of said air spaces into frictional contact with said pole member without axially moving said other end of said coil-wound spring assembly while circumferentially contacting said tabs and thereby causing said spring assembly to frictionally engage said driving member to thereby drive said driven member.

3. An electromagnetic spring-wound clutch comprising an input pulley assembly including a hub member, a pulley groove portion and a radial pole member interconnecting said hub member and said pulley groove portion, a plurality of circumferentially aligned arcuate slots formed in said radial pole member, an output shaft, a hub member mounted on said output shaft axially aligned with said pulley hub member for relative rotation about a common axis, a stationary coil housing having a radial wall portion adjacent said radial pole member both radially outwardly and radially inwardly of said arcuate slots, an electromagnetic coil mounted in said coil housing, a coil-wound spring assembly including a pair of coil springs threadedly interconnected and mounted around adjacent portions of said input pulley hub member and said output shaft hub member and having one end thereof drivingly connected to said output shaft hub member, and a pair of clutch armature disc members each including an axially extending lip portion extending beyond a portion of the other end of said coil-wound spring assembly and rotatable therewith while movable axially relative thereto, said radial pole member being located intermediate said coil housing and the adjacent clutch armature disc member of said pair of armature disc members, a first predetermined air space intermediate said coil housing and said radial pole member, a second predetermined air space intermediate said radial pole member and said adjacent clutch armature disc member, said coil when energized drawing said pair of clutch armature disc members as a unit axially through said second air space so as to close said second air space and bring said adjacent clutch armature disc member into frictional contact with said radial pole member without axially moving said other end of said coil-wound spring assembly while causing said pair of coil springs to grippingly engage said pulley hub member to thereby drive said output hub member and said output shaft, the flux path being from said coil housing across said first air space to said pole member radially outwardly of said arcuate slots, thence across said variable second air space to said pair of abutting clutch armature disc members and back across said variable second air space to said pole member radially inwardly of said arcuate slots, and across said first air space to said coil housing.

4. An electromagnetic spring-wound clutch comprising an input pulley assembly including a hub member, a pulley groove portion and a pole member interconnecting said hub member and said pulley groove portion, said pole member including a radial wall portion and a cylindrical wall portion, an output shaft, an output hub member mounted on said output shaft axially aligned with said pulley hub member for relative rotation about a common axis, a pair of oppositely disposed radial slots formed on an end of said output hub member, a stationary coil housing, said radial wall portion and said cylindrical wall portion each being located a predetermined air space apart from side and peripheral wall portions of said coil housing, an electromagnetic coil mounted in said coil housing, a coil-wound spring assembly including two coil springs threaded together so as to form one unit, an inwardly extending tab formed on one end-loop of each spring of said two coil springs, an outwardly extending tab formed on the other end-loop of each spring of said two coil springs, said unit being mounted around adjacent portions of said input pulley hub member and said output hub member and having said inwardly extending tabs mounted in said radial slots of said output hub member, and a pair of abutting armature discs operatively connected to the other end of said coil-wound spring assembly and movable axially relative thereto, an axially extending lip formed adjacent the outer periphery of each of said armature discs, said lips being positioned so as to be oppositely disposed from one another, an opening formed in each of said lips, said outwardly extending tabs being mounted through said respective openings, said openings being sufficiently wide to permit lateral movement of said discs without laterally moving said outwardly extending tabs, said adjacent armature disc of said pair of discs being located a predetermined air space apart from said radial wall portion of said pole member, said coil when energized drawing said pair of armature discs axially through said last-mentioned air space into frictional contact with said radial wall portion of said pole member causing said two coil springs to wrap around said pulley hub member for rotation therewith to thereby rotate said output hub member and said output shaft with said pulley hub member.

5. An electromagnetic spring-wound clutch comprising driving and driven members axially aligned for relative rotation about a common axis, a stationary coil housing, an electromagnetic coil mounted in said coil housing, a coil-wound spring assembly including two coil springs threadedly interconnected and mounted around adjacent portions of said driving and driven members and having one end thereof drivingly connected to said driven member and oppositely disposed outwardly extending tabs formed on the respective other ends of said two coil springs, a retaining cap secured to the end face of said driven member and extending axially across said two coil springs radially outwardly thereof, first and second clutch armature disc members each including an annular portion and an axially extending lip portion, a recess formed in a face of said second disc member for mounting therein of said first disc member, an arcuate slot formed in said second disc member oppositely disposed from said lip portion thereof for the extension therethrough of said lip portion of said first disc member, an opening formed in each of said axially extending lip portions for the respective extension therethrough of said outwardly extending tabs, an additional pair of axially extending lip portions formed on said second disc member to serve as guides around said retaining cap, and a radially extending pole member formed on said driving member intermediate said annular portion of said adjacent clutch armature disc member and said coil housing respective predetermined air spaces apart therefrom, said coil when energized drawing said pair of clutch armature disc members axially through one of said air spaces into frictional contact with said pole member without axially moving said other end of said coil-wound spring assembly while circumferentially contacting said tabs and thereby causing said spring assembly to frictionally engage said driving member to thereby drive said driven member.

6. An electromagnetic spring-wound clutch comprising driving and driven members axially aligned for relative rotation about a common axis, a stationary coil housing, an electromagnetic coil mounted in said coil housing, a coil-wound spring assembly including two coil springs threadedly interconnected and mounted around adjacent portions of said driving and driven members and having one end thereof drivingly connected to said driven member and oppositely disposed outwardly extending tabs formed on the respective other ends of said two coil springs, a retaining cap secured to the end face of said driven member and extending axially across said two coil springs radially outwardly thereof, a pair of identical abutting clutch armature disc members each including an annular portion and a plurality of guide portions extending axially past an end portion of said retaining cap, an opening formed in one of each set of said plurality of axially extending guide portions for the respective extension therethrough of said outwardly extending tabs, and a radially extending pole member formed on said driving member intermediate said annular portion of said adjacent clutch armature disc member and said coil housing respective predetermined air spaces apart therefrom, said coil when energized drawing said pair of clutch armature disc members axially through one of said air spaces into frictional contact with said pole member without axially moving said other end of said coil-wound spring assembly while circumferentially contacting said tabs and thereby causing said spring assembly to frictionally engage said driving member to thereby drive said driven member.

7. An electromagnetic spring-wound clutch comprising driving and driven members axially aligned for relative rotation about a common axis; a stationary coil housing; an electromagnetic coil mounted in said coil housing; a coil-wound spring assembly including two coil springs threadedly interconnected and mounted around adjacent portions of said driving and driven members and having one end thereof drivingly connected to said driven member and oppositely disposed outwardly extending tabs formed on the respective other ends of said two coil springs; a retaining cap secured to the end face of said driven member and extending axially across said two coil springs radially outwardly thereof; a pair of identical clutch armature disc members each including an annular portion; a plurality of guide portions extending axially past an end portion of said retaining cap, a broken portion formed in each of said annular portions oppositely disposed from a radial bend-portion formed in each of said annular portions, said broken portions and said radial bend-portion serving to permit said pair of disc members to be threadedly interconnected such that each face of the assembly includes half of each of said annular portions in the same plane, and an opening formed in one of each set of said plurality of axially extending guide portions for the respective extension therethrough of said outwardly extending tabs; and a radially extending pole member formed on said driving member intermediate said adjacent planar portion of said clutch armature disc member assembly and said coil housing respective predetermined air spaces apart therefrom, said coil when energized drawing said clutch armature disc member assembly axially through one of said air spaces into frictional contact with said pole member without axially moving said other end of said coil-wound spring assembly while circumferentially contacting said outwardly extending tabs and thereby causing said spring assembly to frictionally engage said driving member to thereby drive said driven member.

* * * * *